Patented Apr. 8, 1952

2,592,435

UNITED STATES PATENT OFFICE 2,592,435

DECOMPOSITION PRODUCT DEPOSIT REDUCTION

Antoine E. Lacomblé, New York, N. Y., assignor to Shell Development Company, San Francisco, Calif., a corporation of Delaware No Drawing. Application May 14, 1949,
Serial No. 93,419

8 Claims. (Cl. 252—51.5)

This invention relates to the reduction of combustion chamber deposits obtained in the operation of internal combustion engines. More specifically, it relates to methods of lubricating those engines, and methods of decomposing and burning the fuels in such, so as to materially decrease the formation of said deposits. This invention also relates to novel compositions which are particularly valuable for use in the above methods.

The deleterious effects of combustion chamber deposits in internal combustion engines are well known. For example, in spark ignition internal combustion engines, especially those operating on gasolines containing tetra-ethyl lead, deposits are formed which adhere to the various parts, such as the spark plugs, valve stems, piston crown, and the like, of the engine which come in contact with the combustion products of such fuels (gasolines), resulting in failure or deterioration, or both, of the affected parts. Scavenging agents, such as ethylene dibromide, normally added to leaded fuels, aid in preventing such deposition, but no such agent is known which even substantially solves the deposition problem. Engines which operate on non-leaded fuels, such as diesel engines, also suffer from deposition (of some of the products of combustion) on the various parts of the engine, especially in the combustion chamber. Although the nature of the deposits varies according to the fuel composition employed and the conditions under which it is used, the deleterious effects of all types of these deposits are recognized. For instance, in spark ignition internal combustion engines operating on leaded gasoline the deposits contain a substantial portion of lead compounds, while in spark ignition internal combustion engines operating on non-leaded gasoline, and in compression ignition engines, such as diesel engines, the deposits are largely carbonaceous in nature. The use of scavenging agents, which at best are inadequate, the use of special cleaning solvents, e. g., by flooding the combustion chambers therewith, and mechanical means, such as scraping, both of which latter methods require that the engine be idle, are the chief methods used until now for combating combustion chamber deposits.

It is therefore an object of this invention to provide novel and effective methods for inhibiting the formation of, and/or reducing the amount of, combustion chamber deposits in internal combustion engines. More particularly, it is an object of this invention to provide a new method of lubricating these engines, and a novel and effective method of decomposing gasoline hydrocarbons (particularly in spark ignition engines) so as to decrease the previously mentioned deleterious deposition. It is also an object to provide a novel and effective method of decomposing organic compounds in the presence of certain deposit reduction agents so as to inhibit the deposition of products resulting from said decomposition. A further object is to provide novel compositions for the above uses. Other objects and their achievements in accordance with this invention will become apparent hereinafter.

It has now been found that the presence of N-nitro organic compounds, as defined below, in an elevated temperature decomposition zone, such as the combustion chambers of internal combustion engines, will cause a reduction in quantity of the deposits normally obtained therein. A particularly advantageous method of introducing the above nitro compounds into the combustion chambers of the engines, and consequently into the presence of the decomposing or burning fuels, is by incorporating such compounds into the lubricating oils to be used in said internal combustion engines. Thus, the resultant new and useful lubricating compositions, as well as the novel methods of lubricating engines and of decomposing hydrocarbon fuels, are contemplated as being within the scope of the present invention.

The term "N-nitro compounds," as used herein, is intended to include all organic compounds having a nitro group attached to a nitrogen atom which is in turn attached to, or a part of, an organic radical. These compounds may be represented by the general formula

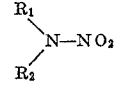

wherein $R_1$ and $R_2$ are similar or dissimilar atoms or groups of atoms (radicals), at least one of which is an organic radical, or wherein $R_1$ and $R_2$ are a single divalent radical. Preferred compounds are those in which $R_1$ and $R_2$ are hydrocarbyl radicals or in which one of them is a hydrocarbyl radical and the other is a hydrogen atom. These compounds, known as nitramines, may contain radicals such as alkyl, alkenyl, aralkyl, alkaryl, aryl, alicyclic, cycloolefinic, and the like. Examples of such nitramines are the N-nitro derivatives of ethylamine, iso-propylamine, pentylamine, crotylamine, benzylamine, para-ethylphenylamine, aniline, cyclopentylamine, cyclohexylamine, tertiary-butyl-ethylamine, dicyclohexylamine, benzylhexylamine, naphthylmethylamine, diaphenylamine, phenyl-p-tolylamine, phenylene diamine, various polyamines, etc.

Another preferred class of compounds are those having the above structural formula in which $R_1$ and $R_2$ form a single divalent organic radical, thus resulting in N-nitro derivative of heterocyclic nitrogen ring compounds. Among these latter compounds are pyrrole, pyrrolidine, pyridine, piperidine, piperazine, morpholine, and the like.

The above hydrocarbyl or heterocyclic radicals may themselves contain other substituent elements such as halogen atoms, or groups such as carboxyl, carboxylate, sulfonate, hydroxy, acyl, amide, etc., radicals. These substituents may also be joined to the nitrogen atom, such as in N-nitro urea, N-nitro-N-butyl carbamate, nitroguanidine, N-nitro N-chloramines, etc.

Also included in the scope of this invention are the derivatives of imino compounds such as N-nitro-acetimino-ethyl-ether and the like, wherein the nitro group is attached to a nitrogen atom which is in turn attached to a single divalent radical by means of a double bond.

As pointed out hereinbefore, combustion chamber deposits are eliminated or materially reduced by decomposing or burning the fuels, particularly gasoline hydrocarbon fuels, in the presence of the N-nitro compounds. Any of various possible and feasible methods of providing for the presence of such deposit reduction agents may be used. For example, they may be incorporated in the fuel, or they may be separately injected into the combustion chamber or fuel intake manifold. A particularly advantageous method is that of adding the agents to the lubricating oils to be used in internal combustion engines.

In preparing such lubricating oil compositions, one or more of the above-described N-nitro compounds is incorporated in a liquid lubricant which will generally have a minimum boiling point of about 700° F. and viscosity of at least 100 Saybolt units at 100° F., and preferably higher, such as a mineral lubricating oil, synthetic lubricant of hydrocarbon or non-hydrocarbon origin, and the like. Preferably, these N-nitro additives are dissolved in the lubricating oil, although they may be dispersed or emulsified therein where necessary or desirable. In the latter case, emulsifying agents, such as triethanolamine oleate, sodium oleate, the alkali metal sulfonates, and the like, may be advantageously employed. In order to impart substantial oil solubility to the additives of the invention, the total number of carbon atoms per molecule should be at least about 5, and preferably the total number should not be over about 40. Solutizers for the additives may also be employed in some instances. The quantity of the present additives to be incorporated in lubricants may be varied between about .001% and about 5% by weight, and good results obtained therewith, but preferably from about 0.01% to about 0.5% by weight is employed, since excellent results are economically obtained therewith. However, larger or smaller amounts of the additives, or mixtures thereof, may also be used.

Other additives which impart special properties to the lubricating composition may be incorporated in the oils where desirable. For example, pour point depressants, viscosity index improvers, oiliness carriers, and the like, may be used without adversely affecting the action of the additives of the present invention, and the beneficial effects of such additional additives are obtained.

When this invention is practiced by incorporating the combustion chamber deposit reduction agents in the lubricating oil, an additional beneficial effect has been noted, viz., the amount of lacquering on the piston skirt is noticeably decreased.

Although not necessary to the understanding and practice of this invention, the following example is presented as illustrative of the results which may be achieved, and the invention is not to be considered as limited thereby.

*Example*

One-tenth per cent by weight of dicyclohexylnitramine was dissolved in a mineral lubricating oil having a viscosity of 120 Saybolt seconds at 210° F. This lubricating composition was tested in a Lauson supercharged engine (spark ignition, liquid cooled, 2.6 inch bore, 2.5 inch stroke) operated for 10 hours at a speed of 2050 R. P. M. under a load of 5.0 B. H. P. The fuel used was a 100 octane leaded gasoline. The quantity of combustion chamber deposits on the piston crown was rated as "8" compared to a rating of "5" for the crown deposits resulting from the base oil without the additive and a rating of "10" for a piston free from any deposits. The lacquering of the piston skirt was rated as "9.5" as compared to "8" for oil without additive and "10" for a skirt with no lacquering.

I claim as my invention:

1. A lubricating oil composition comprising a predominant amount of a mineral lubricating oil and a minor but effective deposit reducing amount of dicyclohexyl nitramine.

2. A lubricating oil composition comprising a predominant amount of a mineral lubricating oil and a minor but effective deposit reducing amount of an oil-soluble aliphatic nitramine.

3. A lubricating oil composition comprising a predominant amount of a mineral lubricating oil and a minor but effective deposit reducing amount of an N-unsubstituted hydrocarbon nitramine.

4. A lubricating oil composition comprising a predominant amount of a mineral lubricating oil and a minor but effective deposit reducing amount of an N,N-dihydrocarbyl nitramine.

5. A gasoline fuel composition comprising a predominant amount of hydrocarbons boiling in the gasoline range, and a minor but effective deposit reducing amount of dicyclohexyl nitramine.

6. A gasoline fuel composition comprising a predominant amount of hydrocarbons boiling in the gasoline range, and a minor but effective deposit reducing amount of an N,N-dihydrocarbyl nitramine.

7. A gasoline fuel composition comprising a predominant amount of hydrocarbons boiling in the gasoline fuel range, and a minor but effective deposit reducing amount of an N-unsubstituted hydrocarbon nitramine.

8. A gasoline fuel composition comprising a predominant amount of hydrocarbons boiling in the gasoline fuel range, and a minor but effective deposit reducing amount of an oil-soluble aliphatic nitramine.

ANTOINE E. LACOMBLÉ.

(References on following page)

REFERENCES CITED

The following references are of record in the file of this patent:

UNITED STATES PATENTS

| Number | Name | Date |
|---|---|---|
| 2,009,818 | Salzberg | July 30, 1935 |
| 2,197,167 | Egerton | Mar. 26, 1940 |
| 2,432,839 | Wachter | Dec. 16, 1947 |
| 2,438,452 | Pollack | Mar. 23, 1948 |
| 2,462,052 | Wright | Feb. 15, 1949 |
| 2,514,017 | Wachter et al. | July 4, 1950 |
| 2,514,018 | Wachter et al. | July 4, 1950 |

FOREIGN PATENTS

| Number | Country | Date |
|---|---|---|
| 599,132 | Great Britain | Mar. 5, 1948 |

OTHER REFERENCES

Canadian Journal of Research, vol. 26.B, March 1948, p. 266.